Aug. 1, 1967    G. JUNGBLUTH ET AL    3,333,763
SEALING ARRANGEMENT FOR ROTARY ENGINES
Filed Jan. 30, 1967    2 Sheets-Sheet 2

INVENTORS
GEORG JUNGBLUTH
WERNER AUTRUM
BY Raymond P. Wallace
THEIR AGENT

United States Patent Office 3,333,763
Patented Aug. 1, 1967

3,333,763
SEALING ARRANGEMENT FOR ROTARY ENGINES
Georg Jungbluth, Kirchhausen, and Werner Autrum, Heilbronn-Bockingen, Germany, assignors to NSU Motorenwerke Aktiengesellschaft, Neckarsulm, and Wankel G.m.b.H., Lindau, Germany
Filed Jan. 30, 1967, Ser. No. 612,406
Claims priority, application Germany, Feb. 2, 1966, N 27,987
8 Claims. (Cl. 230—145)

ABSTRACT OF THE DISCLOSURE

A rotary combustion engine wherein annular radially expanding oil seals are employed about the eccentric portion of the shaft to sealingly engage, in a radial direction, the cylindrical inner surface of the rotor. A resilient element is placed adjacent to and urges at least one oil seal in an axial direction against an annular radially extending surface of the eccentric portion.

Background of the invention

This invention relates to internal combustion engines and more particularly to rotary engines and to an improved sealing arrangement therefor.

Rotary combustion engines generally have an outer body or housing. Within the housing is a cavity defined by a peripheral wall interconnected by a pair of axially spaced end walls. A shaft extends through apertures in the end walls. A rotor is rotatably mounted about an eccentric portion of the shaft within the cavity. The rotor is so shaped as to define between itself, the peripheral, and end walls a plurality of variable volume working chambers. Within these chambers it is customary to insert a fluid, such as air for combustion with a fuel, and to carry out the stages of intake, compression, expansion, and exhaust.

A rotary engine of the above type was disclosed in U.S. Patent No. 2,988,065 granted June 13, 1961, to Felix Wankel et al.

It is customary to cool and lubricate a rotary combustion engine by circulating a lubricating medium, such as oil, through and about the bearings and within the rotor.

Rotor seals (commonly called apex and face seals) are required to prevent the leakage of the working fluid from the working chambers. In addition, oil seals are provided to prevent or minimize oil flow into the working chambers. The oil seals reduce undesirable oil consumption and prevent the "fouling" of the working chambers.

Various suggestions have been made for sealing the working chambers against leakage of oil therein. One proposed arrangement places seals in grooves on the rotor side walls, parallel to the axially spaced end walls of the cavity. A spring, or other resilient means, is placed within each rotor seal groove to urge its associated seal axially into contact with the end walls. However, because of possible distortion due to high combustion temperatures and/or the rough or uneven character of the cavity walls, such seals do not always make a leak proof contact.

Another proposed arrangement employs axially expanding seals in a specially constructed lip or disk portion of the eccentric section of the shaft. The seals engage the side walls of the rotor. This construction has disadvantages in that the overlapping arrangement of the lip and rotor make its construction complex and its repair difficult.

A further suggested arrangement employs radially expanding seals between the shaft and axially extending surfaces of both the rotor and the housing. Such radial seals are placed in annular grooves in the shaft. A complete seal is maintained by two factors: first, the pressure of the seals radially bearing against both the rotor and the housing surfaces; and, second, the engagement of radially extending walls of the grooves due to the presence of gas pressure. However, in order to maintain the correct gas pressure, a specially constructed valve must be used to vent the side walls of the cavity. In addition, this particular arrangement is not suitable where a side inlet port is provided for the introduction of fluid into the working chambers.

Summary

A rotary engine has a housing with axially spaced end walls interconnected by a peripheral wall to form a cavity. A shaft, having an eccentric portion, is rotatably mounted within the housing cavity. A rotor is supported coaxially on the eccentric portion for rotation relative to the eccentric portion and the housing.

The rotor in combination with the housing walls forms a plurality of variable volume working chambers. The rotor has a cylindrical inner surface which extends coaxially with the axis of the eccentric shaft. The rotor, the shaft and the housing, taken together, have passages for the circulation of oil. These passages communicate with the cylindrical inner surface of the rotor.

An oil sealing arrangement is provided to prevent oil from entering the working chambers. This oil seal arrangement combines various structural elements of the engine, at least one oil seal, and a resilient element. The annular and radially expanding oil seal is employed about the eccentric portion, adjacent the side wall of the rotor, and bears sealingly against the cylindrical surface of the rotor. A resilient element is placed adjacent to and urges the seal against an annular radially extending surface of the eccentric portion. Means are provided to support the resilient element.

In one embodiment of this invention, two oil seals are placed about an eccentric portion and bear sealingly against the cylindrical inner surface of a rotor. A wave spring is placed adjacent one of the oil seals for urging the second oil seal axially against a radially extending surface of the eccentric portion. The means for supporting the wave spring is a radially extending inner wall of the rotor.

Among the many advantages of this arrangement over the prior art is its simplicity of construction and hence its more economical manufacture. In addition it is to be noted that this inventive apparatus removes the necessity of gas pressure to secure an adequate seal.

Description of the preferred embodiments

Figure 1:
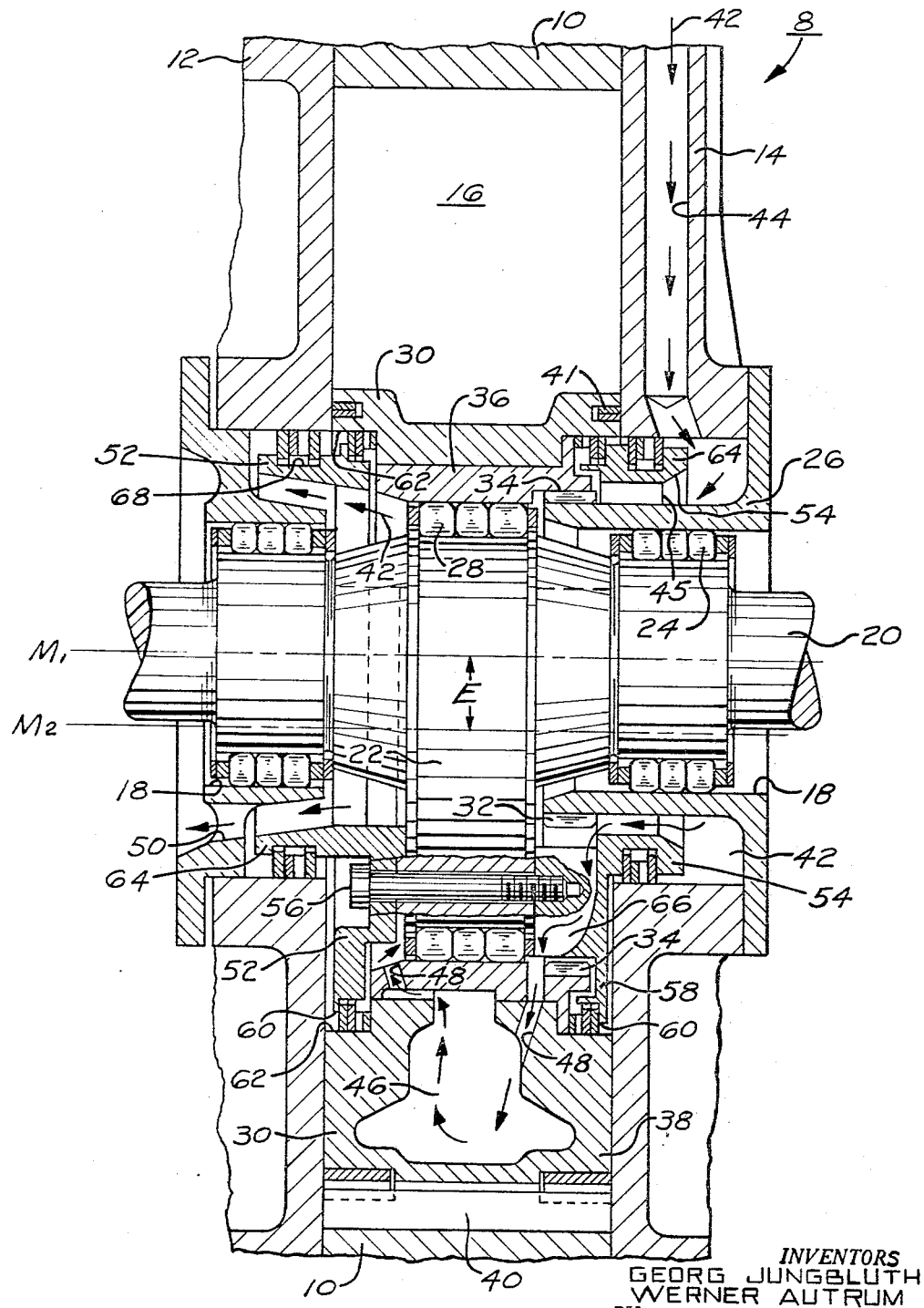
FIG. 1 is a cross-section view of a rotary combustion engine of the type to which the present invention may be applied.

Referring to FIG. 1, there is shown a rotary combustion engine. The supporting structure of this engine is characterized by a housing 8 which comprises a peripheral wall 10 and a pair of axially spaced end walls 12 and 14. The interior surface of these walls 10, 12 and 14 together form a cavity 16 within the housing 8.

The end walls 12 and 14 of the housing 8 have a pair of opposed apertures 18 into the cavity 16. A shaft 20 extends through these apertures 18, into the cavity 16, and without the housing 8. An eccentric portion 22 of the shaft 20 resides within the cavity 16. Bearings 24 reside within a portion 26 of the end walls 12 and 14, and rotatably support the shaft 20.

Bearings 28 are mounted upon the eccentric portion 22 of the shaft 20 to rotatably support a rotor 30. The rotor 30 rotates relative to the shaft 20 and housing 8. The rotor 30 moves about an indexing means which comprises an externally toothed gear or pinion 32, secured to the end wall portion 26 on one of the end walls 14, in meshing engagement with an internally toothed gear 34. The internal gear 34 is an extension of the inner bearing ring 36 which is secured to the rotor 30 and rests upon the rotor bearings 28.

The embodiment of FIG. 1 illustrates a rotary combustion engine of the type having a peripheral wall 10 in the shape of a two lobed epitrochoid and a rotor 30 having three lobes (not shown). The ratio of rotation of the shaft 20 and its associated eccentric portion 22 with respect to the rotor 30 is 3:1. That is, for each rotation of the rotor 30 about its axis $M_2$ (corresponding to the center of the eccentric portion 22 of the shaft 20), the shaft 20 rotates three times about its axis $M_1$. The eccentricity E of the eccentric portion 22 represents the piston "throw" or stroke of the rotor 30. The rotor 30 rotates within the cavity 16 in such a manner that its apex portions 38 form, in conjunction with the peripheral and end walls 10, 12, and 14, of the housing 8, three variable volume working chambers into which a fluid, such as a fuel-air mixture, can be sprayed and subjected to the functions of intake, compression, expansion, and exhaust. Apex seals 40 and face end seals 41 are provided in the apex portions 38 to retain the fuel-air mixture within the varying volume chambers as the rotor 30 moves about the cavity 16.

Illustration of the other engine operating features including a fuel-air mixture intake port, ignition or spark plug, or an exhaust port for the combustion gases is unnecessary for a complete understanding of the invention and is therefore omitted; an adequate description thereof is to be found in the aforementioned Wankel et al. patent.

The lubrication and cooling system for the bearings 24 and 28, gears 32 and 34 and rotor 30 consists of a series of interconnecting passages in the housing 8, shaft 20 and rotor 30. In the example of the rotary engine of FIG. 1, a lubricating medium, which can be for example oil, circulates in the direction of the arrows 42 through an intake port or channel 44 in an end wall 14, through an annulus 45, about and around the shaft 20, and the portion 26 of the end wall 12 and its associated bearings 24. The oil passes from the annulus 45 about the engaged gears 32 and 34 and the rotor bearings 28. The oil proceeds into and out of cooling passages 46 by means of channels 48 appropriately placed in the rotor 30. The oil circulates about the rotor bearings 28, shaft 20, end wall portion 26, bearings 24 and passes out of the housing 8 through a channel or exit port 50 in the other housing end wall 12.

In order to contain the circulating oil within the areas enumerated, a series of oil seals are employed between the eccentric portion 22 of the shaft 20 and the end walls 12 and 14 of the housing 8 and rotor 30. To this end collars 52 and 54 are secured to either side of the eccentric portion 22 by means of bolts 56.

In FIG. 1 these collars 52 and 54 are affixed facing the end walls 12 and 14 and have laterally extending flange portions 58. The outer edges 60 of these flange portions are annularly shaped and face an axially extending inner cylindrical surface 62 of the rotor 30. The collars 52 and 54 can have, for example, a hub section 64 which surrounds in part the portion 26 of the end walls 12 and 14 holding the bearings 24. Channels 66 are formed in the collars 52 aand 54 to allow for the oil or other coolant to circulate through the engine rotor 30. An example of such a channel 66, shown in FIG. 1, has been partially broken away to show the internal connection of the bolt 56. Oil seals are arranged in an annular groove 68 in the hub 64 and the outer edge 60 of the flange 58, respectively, in each of the collars 52 and 54.

The arrangement of these seals in combination with the engine embodies the principle of this invention. The invention may be more easily understood by reference to FIG. 2 in which objects related to FIG. 1 are referred to by similar reference numerals.

Figure 2:
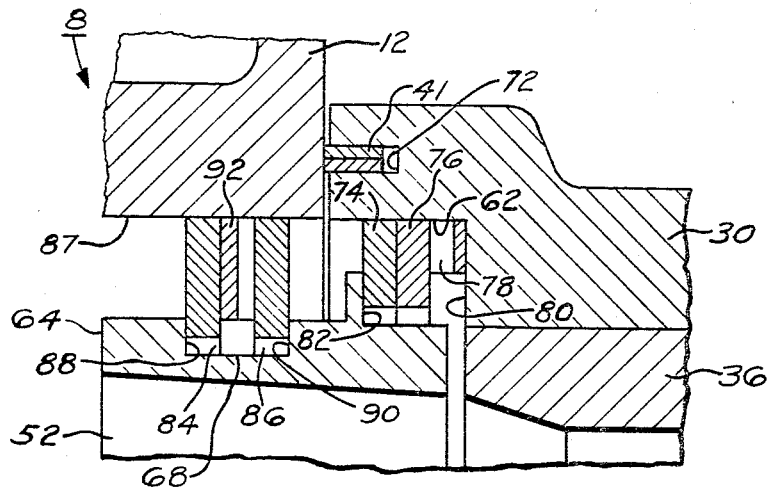
FIG. 2 is a detailed view of the sealing arrangement of FIG. 1 constructed in accordance with the invention.

FIG. 2 shows an enlarged view of a part of the engine shown in FIG. 1. A portion of the rotor 30 is shown with its associated inner bearing ring 36. A face end seal 41 within a groove 72 in the rotor 30 is shown in sealing engagement with an end wall 12 of the housing 8. A section of a collar 52 is shown as it relates to the rotor 30 and the housing 8.

The sealing arrangement of this invention calls for a sealing ring to be placed within a groove in the eccentric portion of the shaft. The ring is outwardly expanding into sealing engagement with an axially extending inner cylindrical wall of the rotor. The seal ring is urged against a lateral wall of an annular radially extending surface of the eccentric portion to form a second sealing surface. With regard to the particular arrangement shown in FIG. 2, a pair of annular, radially extending seals 74 and 76 which can be, for example, split ring seals, are placed about the collar 52 of the eccentric portion 22. The split rings 74 and 76 bear sealingly against the cylindrical inner surface 62 of the rotor 30 and are so arranged that the joints (not shown) are offset to prevent gas and oil from passing therebetween. A resilient element 78 which can be, for example, rubber, wave spring, Belleville spring, or the like, is inserted between a radial wall 80, of the rotor 30, perpendicular to the axis $M_1$ of the shaft 20, and the ring seal 76. The wave spring 78 urges the ring seals 74 and 76 against an annular radially extending surface 82 of the collar 52. The split rings 74 and 76 may be affixed to one another by means of pinning or other similar means to secure against the rotation of one with respect to the other. The combined seals and spring 74, 76 and 78 are constrained to move with the rotor 30 thereby protecting the wave spring 78 from unnecessary wear. A firm seal is thereby maintained by the sealing effect of the seals 74 and 76 between the cylindrical surface 62 of the rotor 30 and the annular surface 82 of the collar 52 without the added use of gas pressure.

An additional arrangement of a resilient element and seals is employed to secure the hub portion 64 and housing 8 against the leakage of oil. Within the annular groove 68 there are placed two seal rings 84 and 86. Placed between these two seals 84 and 86 and urging them against opposed radial sides 88 and 90 of the groove 68 is a resilient element 92 which can be for example, rubber, wave spring, Belleville spring, or the like. As with the first mentioned sealing arrangement the wave spring 92 urges the ring seals 84 and 86 against the radially extending groove sides 88 and 90 to form sealed surfaces. The seals 84 and 86 bear in sealing engagement with an axially extending cylindrical surface 87 of the housing end wall 12.

Figures 3, 4:
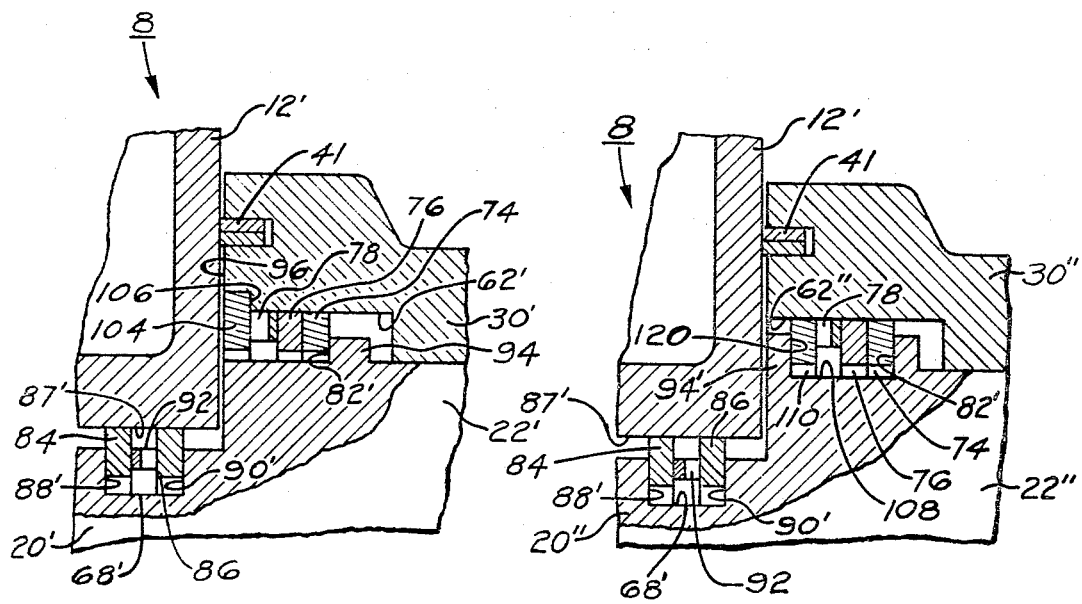
FIGS. 3 and 4 are detailed views of additional embodiments of sealing arrangements constructed in accordance with the invention.

FIG. 3 shows another embodiment of the sealing arrangement constructed in accordance with the invention. Similar reference numerals are used to refer to parts similar to those shown in FIGS. 1 and 2. Those parts which resemble but differ from those shown in FIGS. 1 and 2 are referred to by prime reference numerals.

A rotor 30' is shown having a face seal 41 in sealing engagement with a side wall 12'. Instead of a collar arrangement as shown in FIG. 2, the arrangement of FIG. 3 employs an eccentric portion 22' on the shaft 20' having an annular boss 94 having an annular radially extending surface 82'. Two radially expanding split ring seals 74 and 76 are against a radial wall 82' of the boss 94. A resilient element 78, which can be for example, rubber, wave spring, Belleville spring, or the like, for the resiliently urging of the rings 74 and 76 against the radial wall 82' is held in place by a third, annular, radially expanding seal ring 104. This last mentioned ring 104 is affixed within an annular edge notch 106 in the rotor 30'. The edge notch 106 is formed at the juncture of the side wall 96 and the cylindrical inner surface 62' of the rotor 30'. This arrangement permits greater accessibility to the rings 74, 76, 78 and 104 than would be possible in the arrangement of FIG. 2.

A sealing arrangement for the shaft 20' in FIG. 3 is identical to that employed in the hub section 64 of FIG. 2. Two outwardly expanding ring seals 84 and 86 reside within an annular groove 68' and bear sealingly against a cylindrical surface 87' of the housing end wall 12'. A resilient wave spring 92 is employed between and urging the seals 84 and 86 into a sealing surface against the radial sides 88' and 90' respectively of the groove 68'.

FIG. 4 discloses still another sealing arrangement constructed in accordance with the invention. Parts having a similar form to that shown in FIGS. 1, 2, and 3 retain the same reference numerals. Those parts which resemble but differ from either but not both FIG. 2 and 3 have prime reference numerals. Those parts which resemble but differ from both FIGS. 2 and 3 have double prime reference numerals.

A rotor 30'' is shown in FIG. 4 having its end face seal 41 engaging a side wall 12' of the housing 8. The shaft 20'' has, in a manner similar to that disclosed in FIG. 3, an eccentric portion 22'' constructed in such a way as to provide an annular boss 94' to hold a sealing arrangement. An annular groove 108 in the boss 94' has therein three radially expanding split rings 74, 76, and 110. A resilient element 78, such as a wave spring, is placed between the seals 74, 76 and 110 urging two of the seals 74 and 76 against a radial wall 82' and the third ring 110 against an opposed radial wall 120 of the groove 108. The three seals 74, 76 and 110 bear sealingly against the cylindrical inner surface 62'' of the rotor 30''.

A similar sealing arrangement to that shown in FIGS. 2 and 3 is employed in the embodiment of FIG. 4 to effectively seal the shaft 20'' to the side wall 12' of the housing 8. Two split ring seals 84 and 86 are placed within an annular groove 68'. Placed between the two seals 84 and 86 is a resilient means 92, such as a wave spring, which urges the split rings 84 and 86 against the radial walls 88' and 90' respectively of the groove 68'. The two seals 84 and 86 in the shaft 20'' bear sealingly against the cylindrical surface 87' of the housing end wall 12'.

What is claimed is:
1. A rotary combustion engine comprising:
 a housing having axially spaced end walls interconnected by a peripheral wall to form a cavity therein;
 a shaft extending through and rotatably mounted in the housing, the shaft having an eccentric portion disposed within the cavity;
 a rotor supported coaxially on the eccentric portion for rotation relative to the eccentric portion and the housing; the rotor in combination with the housing walls forming a plurality of variable volume working chambers; the rotor having a cylindrical inner surface coaxial with the axis of the eccentric portion;
 the rotor, the shaft, and the housing together having passages for the circulation of oil, the passages in communication with the cylindrical surface of the rotor; and
 an oil sealing arrangement for restricting oil from entering the working chambers, comprising:
  at least one annular, radially expanding seal about the eccentric portion, adjacent a side wall of the rotor, and bearing in sealing engagement with the cylindrical surface; the eccentric portion having an annular radially extending surface;
  a resilient element adjacent the seal; and,
  means for supporting the resilient element so that the resilient element urges the seal against the radial surface of the eccentric portion.

2. A rotary combustion engine as described in claim 1, wherein:
 the resilient element is a wave spring;
 the supporting means being a surface of the rotor perpendicular to the axis of the shaft; and
 a second annular radially expanding seal interposed between the wave spring and the first seal; the two seals being split rings and having the splits thereof out of alignment.

3. A rotary combustion engine as described in claim 2, wherein:
 the wave spring and seals are constrained to rotate with the rotor.

4. A rotary combustion engine as described in claim 3, wherein:
 the eccentric portion having a collar part, the collar part having a hub, the hub having an annular groove adjacent the axial end wall of the housing;
 the end wall of the housing having a cylindrical inner surface coaxial with the axis of the eccentric portion;
 at least two annular, radially expanding seal rings in the groove, bearing in sealing engagement with the housing cylindrical wall; and,
 a wave spring interposed between the two seals in the groove urging the two seals against the radially extending sides of the groove.

5. A rotary combustion engine, as described in claim 1, wherein:
 the resilient element is a wave spring;
 a second annular radially expanding seal interposed between the wave spring and the first seal; the two seals being split rings and having the splits thereof out of alignment;
 the supporting means comprising:
  the rotor having an edge groove, the edge groove formed at the juncture of the side wall and cylindrical inner surface; and
  an annular and radially extending ring about the eccentric portion and affixed to the rotor within the edge groove, the wave spring interposed between the ring and the seals, the wave spring and seals being constrained to rotate with the rotor.

6. A rotary combustion engine, as described in claim 5, wherein:
 the shaft having an annular groove adjacent the axial end wall of the housing;
 the end wall of the housing having a cylindrical inner surface coaxial with the axis of the shaft;
 at least two annular, radially expanding seal rings in the shaft groove bearing in sealing engagement with the housing cylindrical wall; and,
 a wave spring interposed between the two seals in the shaft groove urging the two seals against the radially extending sides of the groove.

7. A rotary combustion engine, as described in claim 1, wherein:
 the resilient element is a wave spring;
 a second annular radially expanding seal is interposed between the wave spring and the first seal; the two seals being split rings and having the splits thereof out of alignment;
 the support means comprising:
  the eccentric portion having another annular radially extending surface, the two radial surfaces taken together forming an annular groove about the eccentric portion; and,
  a third annular radially expanding seal bearing against the rotor cylindrical surface in sealing engagement, the third seal being within the eccentric groove abutting the second mentioned radial surface thereof and the wave spring.

8. A rotary combustion engine, as described in claim 7, wherein:
the shaft having an annular groove adjacent the axial end wall of the housing;
the end wall of the housing having a cylindrical inner surface coaxial with the axis of the shaft;
at least two annular, radially expanding seal rings in the shaft groove bearing in sealing engagement with the housing cylindrical wall; and,
a wave spring disposed between the two seals in the shaft groove urging the two seals against the radially extending sides of the groove.

References Cited
UNITED STATES PATENTS

| | | | |
|---|---|---|---|
| 3,111,261 | 11/1963 | Bentele et al. | 230—145 |
| 3,165,259 | 1/1965 | Muller et al. | 123—8 |
| 3,171,590 | 3/1965 | Bentele et al. | 230—145 |
| 3,180,323 | 4/1965 | Paschke | 123—8 |
| 3,204,614 | 9/1965 | Huber | 123—8 |
| 3,206,109 | 9/1965 | Paschke | 230—145 |
| 3,249,094 | 5/1966 | Hoppner et al. | 123—8 |
| 3,265,045 | 8/1966 | Bensinger et al. | 123—8 |
| 3,269,370 | 8/1966 | Paschke et al. | 123—8 |

DONLEY J. STOCKING, *Primary Examiner.*

WILBUR J. GOODLIN, *Examiner.*